United States Patent [19]
Kozinczuk

[11] 3,769,958
[45] Nov. 6, 1973

[54] STEAM PRESSURE COOKER
[75] Inventor: Orest A. Kozinczuk, Chicago, Ill.
[73] Assignee: Vischer Products Company, Chicago, Ill.
[22] Filed: June 23, 1971
[21] Appl. No.: 155,999

[52] U.S. Cl. .................................. 126/20, 126/369
[51] Int. Cl. ............................................. A21b 3/02
[58] Field of Search ............................ 126/20, 369; 21/94–98

[56] References Cited
UNITED STATES PATENTS
1,902,625  3/1933  Dunham ............................ 21/94 X
2,208,552  7/1940  Walter .............................. 126/20 X Primary Examiner—Edward G. Favors
Attorney—Marechal et al.

[57] ABSTRACT

A steam pressure unit for cooking food and the like with dry steam includes a double wall at one end which serves as a manifold for feeding steam pipes which then distribute the steam at uniform pressures to the interior of the unit. The manifold also serves as a separator, with condensate which collects in the manifold draining from the manifold through a condensate valve into the interior of the unit for removal therefrom through a drain valve.

6 Claims, 3 Drawing Figures

INVENTOR

OREST A. KOZINCZUK

BY

Marechal, Biebel, French & Bugg

ATTORNEYS 3,769,958

STEAM PRESSURE COOKER

BACKGROUND OF THE INVENTION

Steam pressure cookers which utilize dry, pressurized steam for cooking food products and the like have gained wide spread success, particularly in commercial installations, since they allow fairly large quantities of food to be cooked quite rapidly while, through the use of dry steam to accomplish the cooking, superior appearance and flavor of the cooked food product is obtained.

U.S. Pat. Nos. 3,071,063 and 3,071,473 both disclose steam pressure cookers of this general type. As explained in detail in these two patents, frozen food products may be placed in the pressure cooker and subjected to fine jets of pressurized, dry steam to first thaw the frozen food product and then quickly cook it. Because the steam jets impinge directly upon the food product, thawing and cooking are comparatively rapid. At the same time, because the steam is a dry steam there is little dilution of the juices of the food product, resulting in superior flavor and appearance of the cooked food.

As noted above, steam pressure cookers of the general type just described are used primarily in commercial installations such as restaurants, school cafeterias, etc., because they permit fairly rapid cooking of fairly large quantities of frozen foods. To increase their capabilities in this regard, steam pressure cookers are also manufactured which contain a plurality of steam distribution pipes as contrasted to the single steam distribution pipe shown in each of the two, above noted patents.

Thus, a pair of steam distribution pipes, each having a series of outlets along its length, may be positioned in the interior of the steam pressure cooker extending longitudinally thereof in spaced parallel relationship to each other to direct a plurality of pressurized steam jets onto the food product. In addition to the pair of spaced steam distribution pipes extending along the top of the cooker, additional steam distribution pipes may be positioned along the sides of the cooker with the upper pipes cooking an upper tray of food and the lower pipes cooking a tray of food positioned beneath the upper tray.

To insure that the steam issuing from the steam distribution pipes is free of liquid, i.e. a dry steam, a steam separator is usually positioned upstream of the steam distribution pipe or pipes to separate condensate from the steam and provide a substantially dry steam for delivery to the steam distribution pipe or pipes. In the larger cookers where multiple steam distribution pipes are used it is also desirable to feed the steam into each of the distribution pipes at substantially equal pressures. This has been accomplished by placing appropriate valving mechanism in each of the feed lines to the steam distribution pipes and regulating the valve openings. Obviously, each of these expedients both increase the cost of the cookers and provide additional components which are a possible source of malfunction.

SUMMARY OF THE INVENTION

In a preferred embodiment of the present invention one wall of the pressure treatment vessel, preferably the rear wall, is formed as a double wall to define a steam chamber. Steam is then delivered to the steam chamber where it stabilizes before being fed to the steam distribution pipes mounted within the treatment vessel and communicating with the interior of the chamber through the rear wall of the treatment vessel. In this way, the steam is delivered at substantially uniform pressures to each of the distribution pipes without the necessity of an elaborate valving and control means.

It will also be seen that any liquid present in the steam as it is delivered to the steam chamber will collect in a lower portion thereof as condensate, thereby insuring that only dry steam is fed to the steam distribution pipes. A condensate valve located in the lower portion of the steam chamber allows condensate which collects therein to drain therefrom into the treatment vessel, from whence it is drained by means of a drain valve along with any condensate which forms within the treatment vessel itself.

Thus, the present invention permits the delivery of dry steam at substantially uniform pressures to the steam distribution pipes without the necessity of elaborate valving and control means or a steam separator for removing liquid from the steam.

DESCRIPTION OF THE PREFERRED EMBODIMENT

Figure 1:
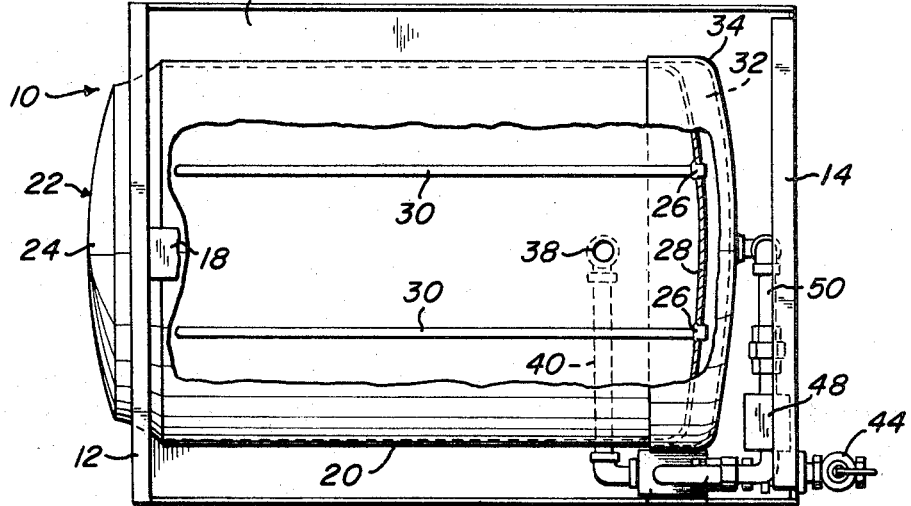
FIG. 1 is a top view of a steam pressure cooker in accordance with the present invention with portions broken away to show the interior of the structure.

As seen in the drawings, the steam pressure cooker 10 of the present invention includes a supporting frame consisting of structural members 12 and 14 adjacent the front and rear thereof, respectively, a bottom plate member 16 and a top frame member 18. The frame work formed by members 12, 14, 16 and 18 supports a substantially cylindrical treatment vessel 20 having an opening at one end 22 normally closed during operation by a door 24. The door 24 is preferably, although not necessarily, of the type disclosed in the above noted U.S. Pat. No. 3,071,063 and 3,071,473, and is flexed into position and held in sealing relationship with the area around the opening of the treatment vessel 20 by internal pressure during the cooking cycle.

Figure 2:
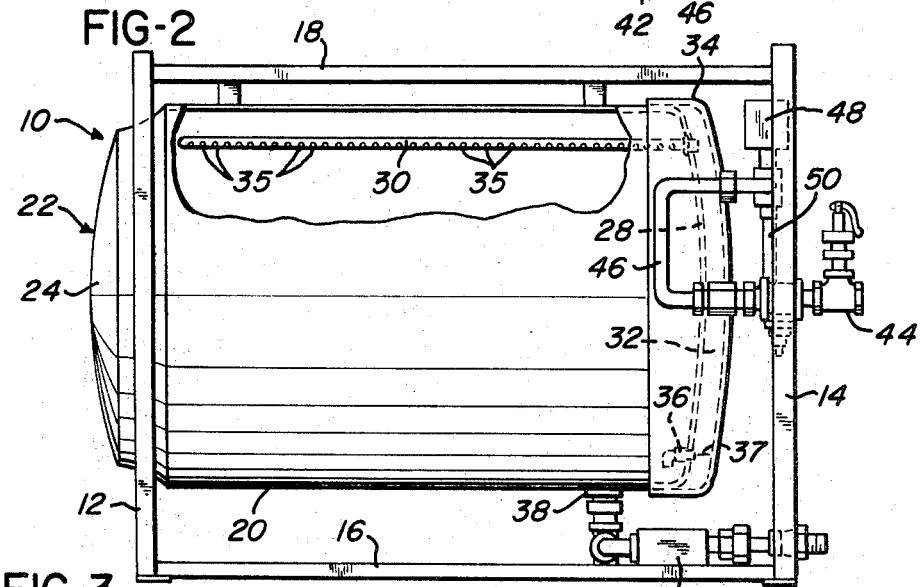
FIG. 2 is a side elevational view, again with portions broken away for purposes of clarity.
Figure 3:
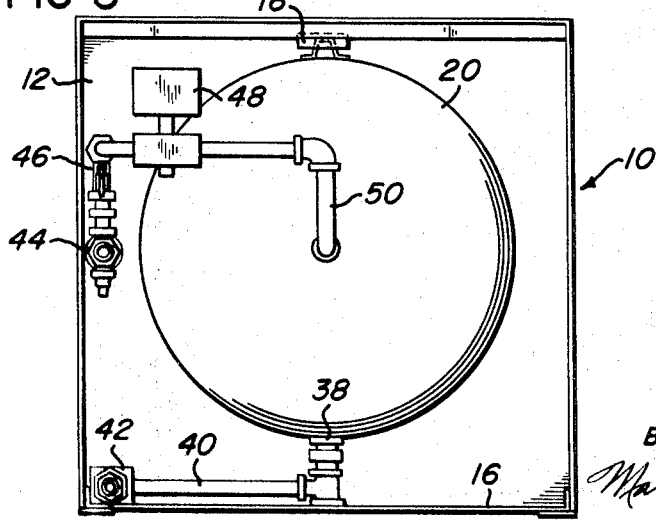
FIG. 3 is a rear view of the structures of FIGS. 1 and 2.

Fittings 26 are mounted in and extend through the rear wall 28 of the vessel 20 and interconnect the steam distribution pipes 30 with a steam chamber 32 formed by a cup-shaped member 34 and the end wall 28. Each of the steam distribution pipes 30, as seen in FIG. 2 of the drawings, is provided with a plurality of regularly spaced apertures 35 throughout its length, there preferably being several rows of such apertues in each steam distribution pipe 30. While only two steam distribution pipes 30 are shown for purposes of simplification, it will be apparent that additional pipes may be provided as required, each communicating with the interior of the steam chamber 32 by suitable interconnecting fittings 26.

Also mounted in the rear wall 28 of the pressure treatment vessel is a condensate drain 36 which serves to drain condensate from the chamber 32 into the interior of the vessel 20 when the condensate level in the chamber 30 reaches approximately the point indicated by the line 37. The interior of the vessel 20 is also provided with a drain 38 which, through the line 40, interconnects with the valve member 42 to provide selective drainage from the bottom of the pressure treatment vessel 20. If desired, drainage of the interior of the vessel 20 may be effected in the manner described in the above noted patents to allow the interior of the vessel 20 to both vent and drain upon start-up of the cooker so that condensate is removed from the cooker and air in the cooker is replaced by dry steam, with the valve closing at some preset pressure to allow pressure in the vessel to then build up to the operating range. Steam is delivered to the interior of the chamber 32 from a steam generator or other supply through connecting line 46, a solenoid valve 48 and a second connecting line 50. The pressure of the steam fed through line 46 is regulated to the desired maximum in any suitable manner, such as a throttling valve.

With the above noted structure the food product to be cooked is placed within the treatment vessel 20, usually in a fozen condition. In a typical, commercial operation the food product will be placed in a standard size pan and supported on suitable brackets, not shown, with the open top of the pan positioned beneath the steam distribution pipes 30. Steam is admitted through valve 48 and interconnecting lines 46 and 50 into the interior of the steam chamber 32.

Condensate and other liquid can collect in the bottom of the chamber 32, from whence it will drain through the condensate valve 36 into the bottom of the pressure treatment vessel 20. Steam, substantially free of liquid, is supplied from the chamber 32, to the steam distribution pipes 30 and issues from the apertures 35 directly onto the food product positioned in the treatment vessel. Since the pressure within the chamber 32 will be substantially uniform throughout its extent the pressure of the steam supplied to each of the pipes 30 will be substantially uniform, providing substantially uniform treatment of the food product contained in the pressure treatment vessel 20.

Additionally, since any liquid, whether from condensate or other sources, delivered to the steam chamber 32 collects in the bottom of the chamber and is drained through the drain 36 of the steam supplied to the pipes 30 is substantially dry steam. This characteristic, as noted above, enhances the flavor and appearance of the cooked food product. Air and liquid are vented and drained from the interior of the vessel 20 through the drain 38 and valve 42 until the pressure within the chamber reaches some preset value, at which time the valve 42 closes to allow a rapid build-up of pressure to the upper range, which in turn is controlled by the valve 48.

In a typical installation steam is delivered to the chamber at approximately 15 lbs per square inch and the valve 42 is set to close at approximately 3 lbs. per square inch of operating pressure. Closure of the valve 42 may also be advantageously utilized to control the operation of a timer which is preset for some particular time interval as determined by the product being cooked, with the timer either actuating suitable audio or visual signals or controlling the supply of steam to the interior of the vessel 20.

It will also be noted that in some instances it may be desired to have more than one range of pressures available. For example, in cooking potatoes a maximum pressure of 5 psi. would be desired. Therefore, a second pressure regulator and a selector switch may be utilized to permit cooking at either 5 psi. or 15 psi.

With the present invention, therefore, it will be seen that means is provided for quickly and efficiently cooking food products at substantially uniform steam pressures and with a substantially dry steam without the necessity of separately controlling valves for the steam distribution pipes nor the use of a steam separator upstream of the treatment vessel.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. A steam pressure cooker comprising:
   a. means defining a pressure treatment vessel,
   b. means for distributing steam within said vessel,
   c. means defining a steam chamber disposed contiguously with at least a portion of said vessel,
   d. means for delivering steam to the interior of said steam chamber,
   e. means interconnecting said interior of said steam chamber and said steam distributing means to supply substantially dry steam substantially uniformly to said steam distributing means, and
   f. a condensate drain placing said steam chamber interior and said treatment vessel in communication to permit condensate to drain from said chamber into said vessel.

2. The cooker of claim 1 wherein:
   a. said steam chamber and said treatment vessel are separated by a common wall.

3. The cooker of claim 2 further comprising:
   a. means mounting said interconnecting means in said common wall.

4. The cooker of claim 3 wherein:
   a. said interconnecting means is mounted in an upper portion of said common wall.

5. A steam pressure cooker comprising:
   a substantially cylindrical pressure treatment vessel having a selectively operable closure at one end thereof and a rear wall opposite said one end,
   b. a substantially cup-shaped member telescopically mounted on said vessel in spaced, overlying relationship to said rear wall and defining therewith a steam chamber,
   c. a plurality of steam distributing pipes positioned in said vessel and mounted in said rear wall in communication with said chamber,
   d. means for delivering steam to said chamber,
   e. a condensate drain mounted on said rear wall at a position beneath said steam distributing pipes for draining condensate from said chamber into said vessel, and
   f. a drain valve mounted in said treatment vessel to drain condensate therefrom.

6. A steam pressure cooker comprising:
   a. means defining a pressure treatment vessel,
   b. means for distributing steam within said vessel,
   c. means defining a steam chamber disposed contiguously with at least a portion of said vessel and separated therefrom by a common wall,
   d. means for delivering steam to the interior of said steam chamber, e. means interconnecting said interior of said steam chamber and said steam distributing means to supply substantially dry steam substantially uniformly to said steam distributing means,
f. means mounting said interconnecting means in an upper portion of said common wall, and
g. a condensate drain mounted in a lower portion of said wall and placing said steam chamber interior and said treatment vessel in communication to permit condensate to drain from said chamber into said vessel.

* * * * *